United States Patent

[11] 3,571,982

| | | |
|---|---|---|
| [72] | Inventor | Joseph J. Ramge<br>1495 Fairholme Road, Grosse Pointe Woods, Mich. 48236 |
| [21] | Appl. No. | 833,348 |
| [22] | Filed | June 16, 1969 |
| [45] | Patented | Mar. 23, 1971 |

[54] WORK MOVING APPARATUS
5 Claims, 3 Drawing Figs.

[52] U.S. Cl. .................................................. 51/219
[51] Int. Cl. .............................................. B24b 3/06
[50] Field of Search ....................................... 51/95
(T.G.), 95 (L.H.), 157, 161, 219, 225, 232

[56] References Cited
UNITED STATES PATENTS
2,250,510  10/1941  Loessker ..................... 51/95

2,330,921  10/1943  Rickenmann ................ 51/95X
3,066,456  12/1962  Ramge ......................... 51/219

Primary Examiner—Granville Y. Custer, Jr.
Attorney—Olsen and Stephenson

ABSTRACT: Apparatus for supporting a tool which must be accurately moved along a predetermined path relative to a cutter, grinding wheel, polishing wheel or the like for forming, grinding, polishing, and/or refluting of the tool wherein improved mechanism is provided for enabling variable proportioning of tool rotation and translation. A simple rack and pinion mechanism is incorporated in the work moving apparatus so that a desired change can be made in the amount of rotation of the tool achieved for each unit of translatory movement of the tool.

PATENTED MAR 23 1971 3,571,982

INVENTOR
JOSEPH J. RAMGE

BY
*Olsen and Stephenson*
ATTORNEYS 3,571,982

1

WORK MOVING APPARATUS

BACKGROUND OF THE INVENTION

The present invention is an improvement on the basic machine disclosed in applicant's prior U.S. Pat. No. 3,066,456 which discloses a work moving machine for use in tool forming, grinding, polishing, refluting and similar operations in which the work, such as end mills, drills, cams, worms and the like, must be accurately moved along a predetermined path relative to a cutter, grinding wheel, polishing wheel or the like. Such machine consists essentially of a main frame, a main slide unit mounted on the frame for translatory movement in one direction, a tool support on the main slide unit rotatably supporting a tool which is to be moved past a stationary grinding wheel, for example, a middle slide unit which is mounted on the main slide unit, is movable in a direction perpendicular to the direction of movement of the main slide unit and is connected to the tool support so that movement of the middle slide unit effects rotation of the work, and a third slide unit which is movable at an oblique angle to the directions of movement of the main and middle slide units. The oblique angle is adjustable, and as a result, for each increment of movement of the third slide unit, the main slide unit is moved a predetermined distance and the tool is rotated through a predetermined angle. This structure enables the forming of flutes in a tool, for example, with a desired lead angle.

Some tools, such as tapered tools, for example, must be formed so that the flutes therein have a variable, rather than a fixed lead. In the work moving machine disclosed in the above patent, the forming of a variable lead flute on a tool is accomplished by adjusting the oblique angle of the third slide unit concurrently with movement of the tool past the grinding wheel. A gear reduction unit is connected to a rotatable support for the third slide unit and is also connected by a belt to the third slide unit so that in response to advance of the third slide unit, the rotatable support therefor is rotated.

It is an object of the present invention to provide improved mechanism for changing the oblique angle of the third slide unit during advance of the work in the basic machine disclosed in applicant's prior patent.

SUMMARY OF THE INVENTION

In the work moving apparatus of this invention, a slotted link is pivotally mounted on the main slide unit for adjustable movement to a plurality of positions inclined with respect to the direction of movement of the main slide unit. The slot in the link constitutes a track for a roller disposed therein and connected to a rod pivotally supported at one end on the machine main frame. The opposite end of the rod is pivotally connected to one end of a rack, the opposite end of which meshes with a gear on which the third slide unit is supported. In response to advance of the main slide unit, the movement of the roller in the track provides for pivotal movement of the rod which in turn moves the rack so as to rotate the gear to in turn continuously change the oblique angle of the third slide unit. The extent of rack movement and thus the amount of change of the oblique angle of the third slide unit is directly related to the angular position of the slotted link. As a result, a desired change of the oblique angle of the third slide unit is readily obtained by adjusting the angular position of the slotted link.

Further objects, features and advantages of this invention will become apparent from a consideration of the following description, the appended claims, and the accompanying drawing in which:

2

Figure 1:
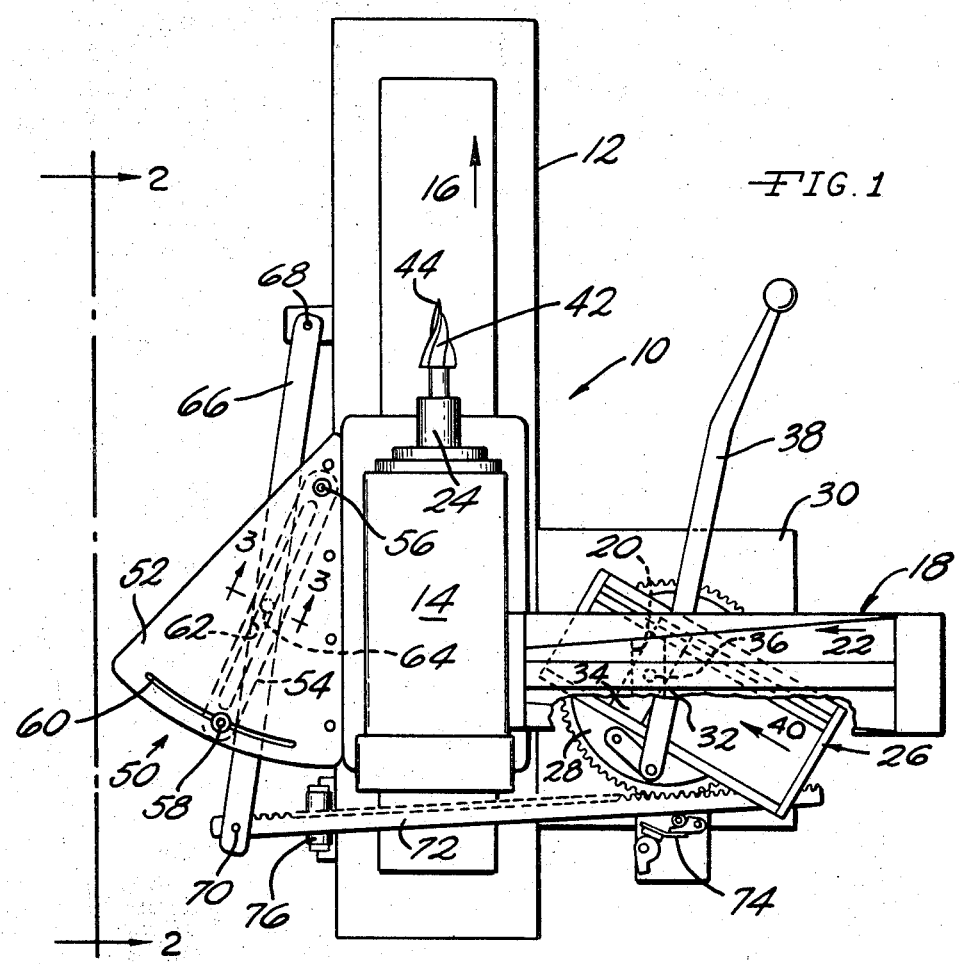
FIG. 1 is a plan view of the work moving apparatus of this invention.
Figure 2:
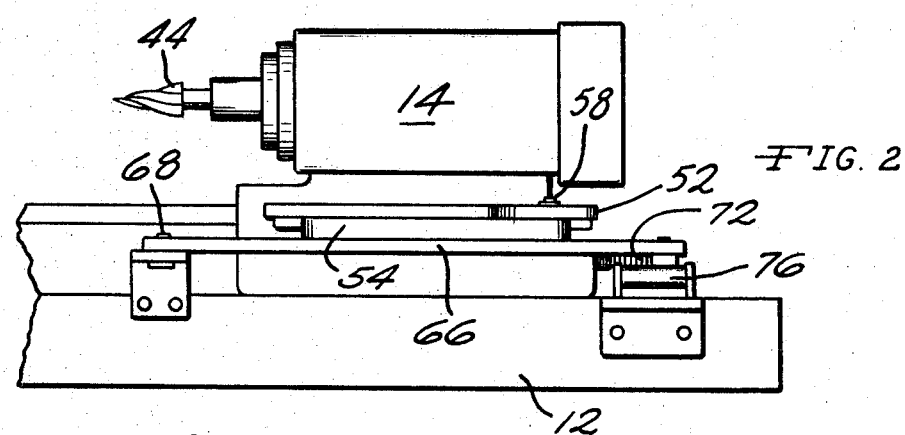
FIG. 2 is a fragmentary elevational view of the apparatus of this invention as seen from substantially the line 2—2 in FIG. 1.
Figure 3:
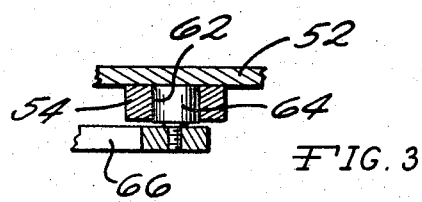
FIG. 3 is a fragmentary enlarged sectional view of a portion of the apparatus of this invention, looking substantially along the line 3—3 in FIG. 1.

With reference to the drawing, the apparatus of this invention, indicated generally at 10, is illustrated in FIG. 1 as including a main frame 12 on which a main slide unit 14 is slidably supported for back and forth movement in the direction indicated by the arrow 16. A middle slide unit 18 secured to the main slide 14 includes a block 20 mounted for back and forth movement in a direction indicated by the arrow 22 which is perpendicular to the direction 16. A tool support 24 is mounted on the main slide unit 14 and is connected to the block 20 so that in response to movement of the block 20 in the direction 22, the tool support 24 is rotated. The structure connecting the tool support 24 to the block is explained in detail in applicant's aforementioned patent and forms no part of the present invention. For purposes of clarity, therefore, a detailed description of this structure is omitted herein.

A third slide unit indicated generally at 26 is fixedly mounted on a gear 28 which is rotatably mounted on an extension 30 of the main frame 12 for rotatable movement about a vertical axis 32. A body 34 slidable in the third slide unit 26 is connected by means such as a pin 36 to the block 20 in the middle slide unit 18, and an actuating lever 38, pivotally mounted on the gear 28, and connected to the body 34 is operable to move the body 34 back and forth in a direction indicated by the arrow 40. For each increment of movement of the body 34 in the direction 40, there is a component of movement of the block 20 in the direction 22 and a component of movement of the main slide unit 14 in the direction 16. The relative magnitudes of the components in the directions 16 and 22 is dependent upon the oblique angle of the direction 40. This angle is adjustable by moving the gear 28 about the axis 32.

When the apparatus 10 is used for some purposes, such as forming flutes 42 on a tapered tool 44, it is necessary to continuously adjust the angle 40 during movement of the slide unit 14 in the direction 16. In the apparatus 10 of this invention, this is accomplished by means of a variable lead mechanism, indicated generally at 50, which includes a support plate 52 secured to the main slide unit 14 and movable therewith. An elongated link 54 pivotally supported at one end on a pin 56 carried by the plate 52. A bolt and nut assembly 58 on the opposite end of the link 54 extends through an arcuate slot 60 in the support plate 52 so that when the assembly 58 is loosened, the link 54 can be pivoted about the pin 56, with the assembly 58 moving in the slot 60 to a desired position after which the assembly 58 is tightened to maintain the link 54 in this position.

The link 54 is formed with a slot 62 in which a roller 64 is positioned. The roller 64 is secured to an elongated rod 66 pivotally supported at one end on a pin 68 carried by the main frame 12. The opposite end of the rod 66 is connected by a pin 70 to one end of a rack or toothed bar 72. The bar 72 is movable about the pivot 70 to a position in which the teeth thereon mesh with the teeth on the gear 28, as shown in FIG. 1. A releasable spring pressed clamp assembly 74, of conventional construction, is operable to resiliently hold the rack 72 in meshing engagement with the gear 28. On release of the clamp 74, the rack 72 is movable to a position spaced from the gear 28 to enable use of the apparatus 10 without the variable lead mechanism 50.

In the operation of the apparatus 10, assume that the variable lead mechanism 50 is in the position illustrated in FIG. 1. When the lever 38 is operated to move the body 34 in the direction of the arrow 40, the block 20 is moved in the direction 22 and the main slide unit 14 is moved in the direction 16 to thus accomplish both rotatable and translatory movement of the tool 44, the relative amounts of such movements depending upon the angle of the direction 40 relative to the directions 16 and 22. For example, to increase the angle of movement of tool support 24 for each inch of movement of slide 14 in direction 16, the gear 28 is rotated counterclockwise to bring direction 40 more nearly into line with direction 22. As the main slide unit 14 moves in the direction 16, the link 54 will move the roller 64 so as to rotate the rod 66 in a clockwise direction about the pin 68, as viewed in FIG. 1. Such movement will result in movement of the rack 72 to the left in FIG. 1 to in turn rotate the gear 28 in a clockwise direction about the axis 22 to continuously change the oblique angle of the direction 40 relative to the directions 16 and 22. To obtain a desired variation in this angle, the inclination of the link 54 relative to the direction 16 can be readily changed by loosening the bolt and nut assembly 58 and moving the link 54 to a desired position. Intermediate its ends, the rack 72 is supported on a roller 76 carried by the main frame 12 to insure the location of the rod 66 and the rack 72 in positions in which the roller 64 will be retained in the slot 62.

From the above description is is seen that in the apparatus 10 of this invention, the variable lead mechanism 50 provides for the desired movement of the gear 28 during advance of the main slide unit 14. For any given job, the link 54 is readily adjusted to a position in which the desired variation in lead is obtained and for that purpose the slot 60 can be calibrated if desired.

I claim:

1. In work moving apparatus having a main frame, a main slide unit movable back and forth on said main frame in one direction, means for rotatably supporting work on said main slide unit, a middle slide unit movable in another direction substantially perpendicular to said one direction and operable in response to said movement to provide for rotation of said work supporting means, a third slide unit disposed at an oblique angle to said one direction and connected to said main and middle slide units so that movement of said third slide unit is operable to provide for movement of said main and middle slide units distances which are proportional to the components of movement of said third slide unit in said one and said other directions, respectively, means movably supporting said third slide unit on said main frame for enabling changing of said oblique angle, said last-mentioned means comprising support means for said third slide unit movable about an axis perpendicular to said directions, actuating means extending transversely of said one direction and connected to said support means so that in response to movement of said actuating means said support means is moved about said axis to change said oblique angle, and means connected to said main slide unit and responsive in operation to movement thereof in said one direction for moving said actuating means.

2. Work moving apparatus according to claim 1 wherein said actuating means and said support means are provided with coacting meshing teeth providing for rotation of said support means about said axis in response to movement of said actuating means.

3. Work moving apparatus according to claim 1 wherein said means connected to said main slide unit includes track means adjustably mounted on said main slide unit for movement to a position extending at an oblique angle to said one direction, and means slidably supported in said track means and connected to said actuating means.

4. Work moving apparatus according to claim 3 wherein said means slidably supported in said track means and connected to said actuating means comprises a rod pivotally connected at one end to said main frame and pivotally connected at the opposite end to said actuating means, and roller means carried by main slide and slidably supported in said track means.

5. Work moving apparatus according to claim 4 wherein said track means comprises an elongated link having a track forming slot therein for receiving said roller means, means pivotally supporting one end of said link on said main slide unit, and means adjustably supporting the opposite end of said link on said mainslide unit.